Figure 1:
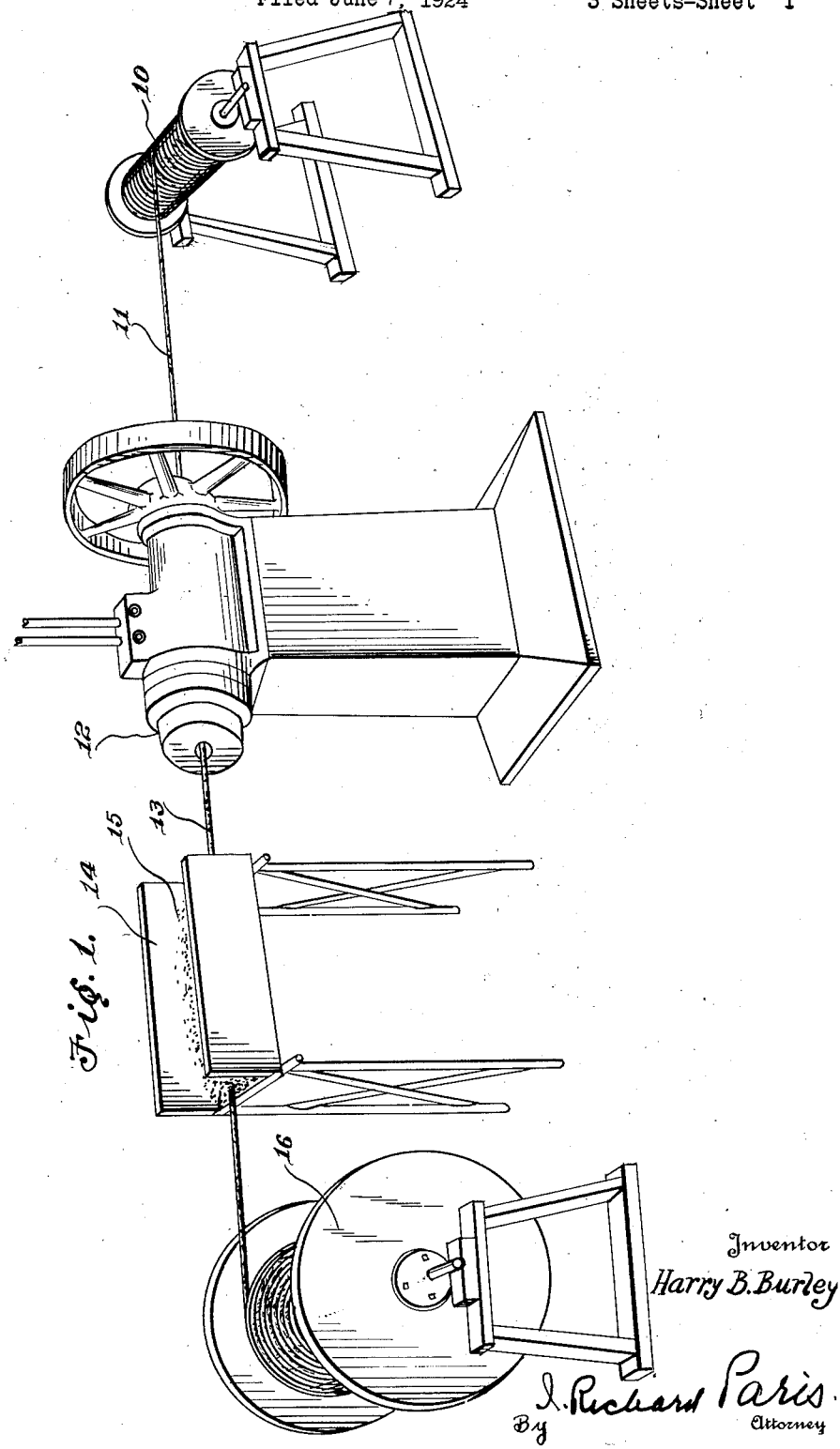

June 19, 1928.

H. B. BURLEY 1,674,156

PROCESS FOR THE MANUFACTURE OF ELECTRIC WIRES

Filed June 7, 1924 3 Sheets-Sheet 2

Inventor
Harry B. Burley

By I. Richard Paris
Attorney

June 19, 1928.

H. B. BURLEY 1,674,156

PROCESS FOR THE MANUFACTURE OF ELECTRIC WIRES

Filed June 7, 1924

3 Sheets-Sheet 3

Inventor

*Harry B. Burley*

By  Attorney

Patented June 19, 1928.

1,674,156

UNITED STATES PATENT OFFICE.

HARRY B. BURLEY, OF BROOKLINE, MASSACHUSETTS, ASSIGNOR TO BOSTON INSULATED WIRE & CABLE COMPANY, A CORPORATION OF MASSACHUSETTS.

PROCESS FOR THE MANUFACTURE OF ELECTRIC WIRES.

Application filed June 7, 1924. Serial No. 718,677.

This application is a continuation in part of my copending application filed February 6, 1922 under Serial Number 534,628.

This invention relates generally to the manufacture of rubber insulated electric wires or cables. More specifically this invention relates to the manufacture of rubber insulated electric wires or cables which are to be used in the transmission of high voltages, such as wires used in high tension ignition systems on internal combustion engines or the like. This invention also relates to the manufacture of rubber insulated electric wires which are to be used under conditions where the wire is exposed to high temperatures. Such conditions arise in connection with ignition systems for internal combustion engines.

The invention has for its object a series of steps which cooperate to produce a rubber insulated wire or cable in which the conductor is disposed symmetrically with relation to the layer of rubber insulation; another object is to obtain a layer of rubber which will withstand wear, abrasion and cracking due to atmospheric and electrical causes and will have a high durability and a long life.

A further object is to manufacture a rubber insulated electric wire in such a manner that for a given thickness of the insulation the dielectric strength or puncture test of the insulation be increased, and that the rubber be capable of withstanding high temperatures.

A further object of the invention is to provide a method of manufacturing such rubber insulated electric wires in which a rubber compound with high rubber contents may be used.

The above objects I accomplish in part by vulcanizing the rubber covered wire in a mold under high pressure. It is found, however, that when it is desired to increase the voltage carrying capacity of a wire beyond certain limits by increasing the thickness of the rubber wall, the advantages gained decrease with the increasing thickness of the wall. I have found that by embedding within the rubber compound insulation one or more interlayers of cotton, flax, hemp or similar fibrous material of a flexible character the voltage carrying capacity of the wire is increased for the same thickness of insulation. An interlayer of such material has a conductivity substantially greater than that of rubber. This interlayer, therefore, acts to distribute over the inner surface of the rubber, surrounding said interlayer material, any leakage of the current through an interior portion of the insulation.

The interlayer of fibrous material may be applied in the form of a braiding, a spiral wrapping or in any other form desired. In order to accomplish my object, I prefer to make this interlayer continuous over the entire surface of the rubber it encloses. It is applied in such a manner as to form a uniform, thin and continuous, closely wrapped, braided, or wound sheath over the inner layer of rubber.

The commonly accepted method of manufacturing rubber insulated electric wires comprises two essential steps. One step is to apply a cylindrical layer of rubber compound to the bare wire. The second step is to vulcanize the layer of rubber. The composition of the rubber compound that is applied to the bare wire may be varied widely. The commonly accepted methods of vulcanizing the rubber vary. One of the methods used is to place the wire in the form of a coil in a pan of powdered mineral matter such as talc, to place the pan and coil in a closed vulcanizing chamber and to pass steam into the chamber. The wires resulting from this process have a pitted surface and the body of the rubber shows voids. The cross section of the wire varies in form on account of the temporary fluidity that the rubber acquires during vulcanization, and the conductor is not always concentric with the layer of rubber. This process therefore is not adapted for use with soft rubber compounds, i. e. rubber compounds that have a high percentage of rubber. Sometimes the expedient of enclosing the rubber covered wire in a sheath of braiding prior to vulcanizing is resorted to. Others enclose the rubber covered wire in a sheath of metal foil which is removed after vulcanization.

The patent to Clark No. 252,739, dated January 24, 1882 shows still another method of vulcanizing rubber covered wire. This patent relates to the manufacture of telegraphic or telephone cables which are composed of a plurality of wires embedded in rubber and thereby insulated each from the other. The sole purpose of the patentee is to insure that the wires remain straight and that the interposed portions of rubber between the wires remain approximately uniform in thickness. To this end the patentee disposes the rubber covered cable in a mold of a shape to maintain such cable in a practically straight condition from end to end of such mold whereby the proper and relative positions of the wires are maintained. This mold is then placed in a chamber open at the ends with the mold protruding through the open ends. Steam pipes which enter and leave the oven through the same openings serve as supports for the mold. The mold of this apparatus is about ten feet in length. A long cable is vulcanized in successive portions. The cable is large in diameter as compared with the length of the mold. The two halves of the mold are held together by means of thumb screws. The pressure to which the rubber is subjected is small.

In the present invention the rubber covered wire is placed in a mold the parts of which are clamped firmly so as to withstand high internal pressures. The size of the groove is small as compared with the length of the mold. The mold and contents are heated to vulcanizing temperature. The result is that very high pressures varying from 300 to 400 pounds per square inch are developed within the mold. In my preferred method the pressure varies from 325 to 350 pounds.

Figure 2:
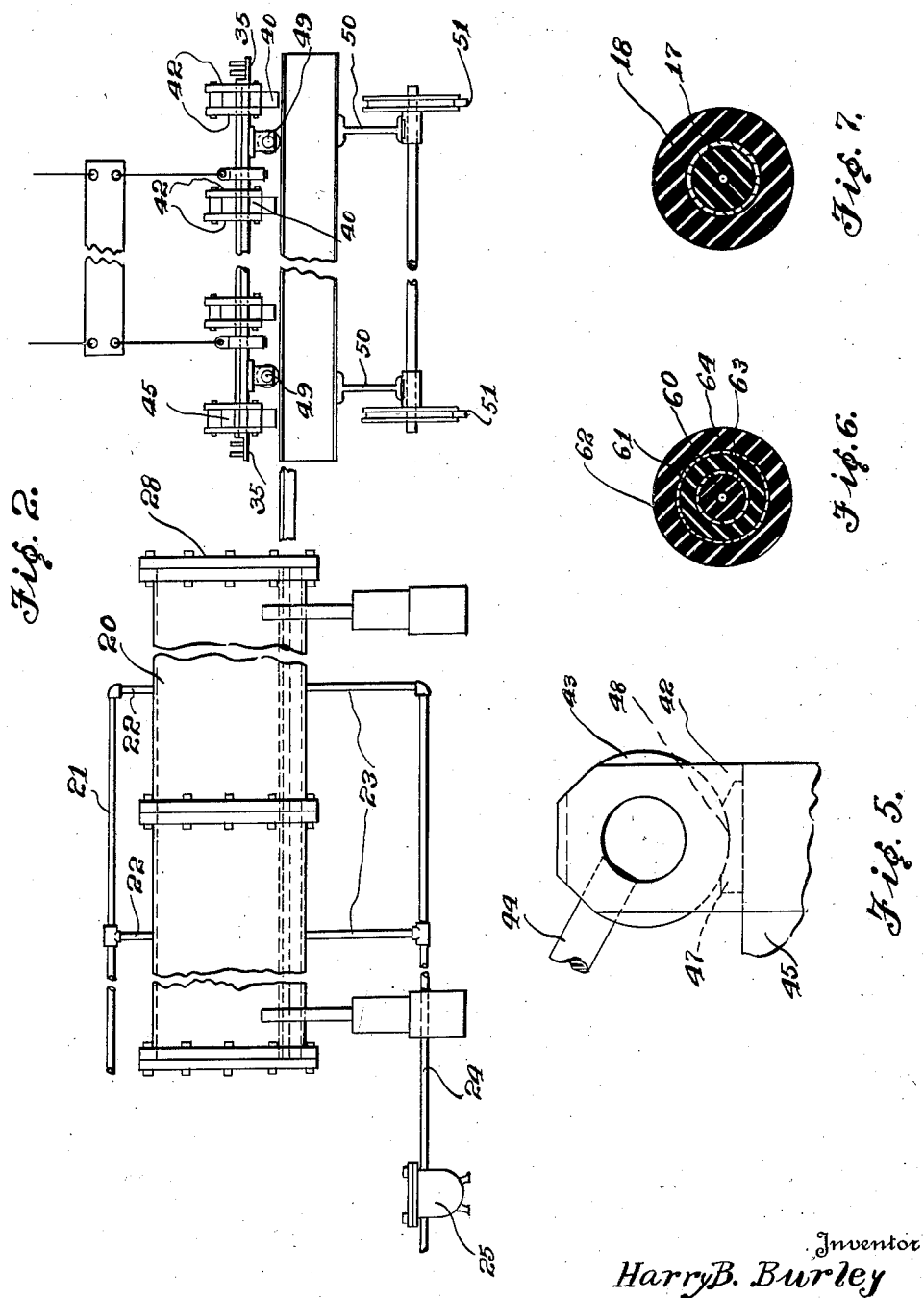
Figure 3:
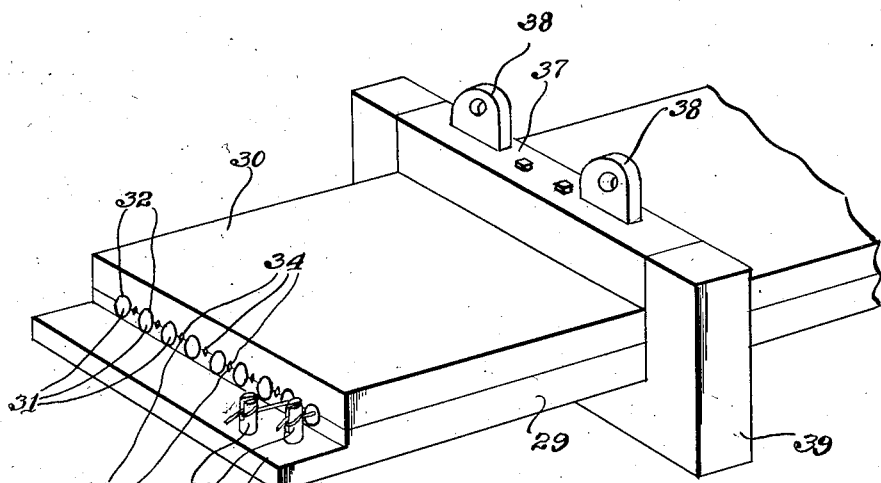
Figure 4:
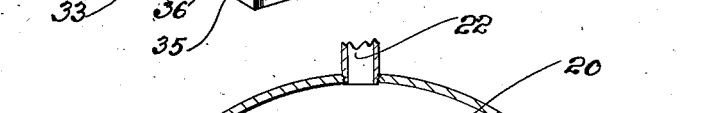

The accompanying drawings illustrate the various steps in the process and the apparatus therefor. Fig. 1 shows the method and apparatus for applying a layer of rubber compound to the bare or covered conductor. Fig. 2 is a view of the apparatus used in the final vulcanization. Fig. 3 is an end perspective of the vulcanizing plates. Fig. 4 is a section of the vulcanizing chamber with the vulcanizing plates therein. Fig. 5 is a detail of the apparatus. Figs. 6 and 7 are sections of the wire or cable manufactured by the process.

The first step in the process is the application of a cylindrical layer of previously prepared rubber compound to the bare conductor. This is carried out by means of the apparatus illustrated in Fig. 1. In this figure 10 is a reel of bare conductor. The bare conductor 11 passes through the insulating machine 12 where it receives a layer of rubber compound of any desired thickness. The rubber cover conductor 13 then passes through a trough 14 containing talc 15 and is wound on drum 16. The talc covers the outer face of the soft warm rubber and prevents from sticking when wound on the drum. The drum is rotated very slowly by a small round, slipping belt. The wire is guided manually to form layers on the drum 16.

A sheath or covering of fibrous material is now applied to the rubber covered wire. This interlayer may be applied in the form of a braiding, a spiral wrapping or in any other form desired. I prefer to use a braiding and I make it continuous over the entire surface of the rubber it encloses. This wrapping is applied by means of apparatus well known in the art. I prefer to make this interlayer in the form of a continuous thin covering over the inner layer of the rubber. This interlayer is indicated by the reference character 17.

The next step in the process is semivulcanizing the first layer of rubber. This may be done in any one of a number of well known ways. I prefer, however, to semivulcanize by the dry heat process. The rubber covered wire is wound on a large drum that revolves on a horizontal shaft in bearings within a large oven. The closed oven is heated for about two and one half hours, gradually raising the temperature to about 235 degrees F. If desired this layer of rubber may be semivulcanized by the pressure process described hereinafter.

The wire is now again passed through the apparatus shown in Fig. 1 where it receives a second layer of rubber compound 18.

The rubber is finally vulcanized by the aid of the apparatus shown in Figures 2, 3, and 4. Briefly, the vulcanization of the rubber on the wire or cable is carried out while it is clamped in grooves between two plates. The plates with the wire between them are placed in a heating chamber where a heating fluid is admitted and the temperature of the wire or cable gradually raised to vulcanizing temperature. The grooves in the two plates are such that when the wires or cables are clamped between the plates they fill the grooves. When heated the rubber becomes semifluid, expands in volume and is subjected to high pressure. The high pressure compresses and condenses the rubber and causes some of it to flow between the plates and enter the overflow grooves. The wire placed between the plates is put under tension and maintained under tension. Referring to the drawings, 20 constitutes the vulcanizing chamber, which may be of any length and diameter desired, but usually approximates the length of the molding plates. The steam or any other heating fluid enters the chamber through the inlet pipe 21 and branches 22. Branches 23 are the outlets from the different portions of the chamber and lead to the common outlet 24. The steam trap 25 placed in the common outlet 24 allows condensed steam to flow out of the system but prevents the escape of live steam.

The chamber 20 is provided in its interior with angle irons 26, 27. These constitute a support for the mold and the truck upon which the mold rests. The angle irons also serve to guide the mold plates in their entry and removal from the chamber. The door 28 of the chamber when bolted makes an air tight closure.

It is the object of this process to manufacture wires in predetermined lengths. It is also the object of this invention to vulcanize the rubber over the entire length of the wire in one step. For this purpose the mold plates are of approximately the full length of the wire. I am using plates that are 50 feet long and some that are 100 feet long. But the length of the molds may be varied as desired.

The mold comprises two plates 29 and 30. The abutting faces of these plates are provided with longitudinal grooves 31 and 32 semicircular in cross section for the reception of the rubber covered wires. These grooves are so disposed that when the plates abut the faces of the grooves coincide thereby providing circular grooves the entire length of the mold. The number of grooves may vary. The plates are additionally provided with corresponding grooves 33, 34 intermediate the wire receiving grooves. These grooves may be of any shape or cross section and serve to receive the overflow of rubber from the wire receiving grooves during the process of vulcanization.

The lower plate 29 is provided with integral portions 35 at each end of the plate, which project beyond the ends of the upper plate. These portions are provided with slotted posts 36, one for each wire receiving groove, to which the ends of the wires are firmly attached in the manner shown.

The upper plate 30 has bolted thereto a plurality of transverse members 37 equal in length to the width of the plate. Some of the members 37 are provided with apertured lugs 38 adapted to be attached to a hoisting apparatus for raising or lowering the plate. The lower plate 29 has bolted thereto a corresponding number of U-shaped members 39. The legs of each member 39 project above the mold flush with the edges thereof and in such a manner as to serve in cooperation with the ends of the members 37 as guides for the positioning of the upper plate 30 in relation to the lower plate 29.

The lower plate 29 is provided with a plurality of transverse members 40 having at each end an apertured projecting portion projecting beyond the edges of the plate. Two arms 42 are pivotally attached to the portion 41. At the free ends of the arms 42 and between them is pivoted an eccentric clamping member 43, which is provided with an operating lever 44. The upper plate 30 is provided with a plurality of transverse members 45 corresponding in number to and cooperating with the members 40 and the clamping elements. The arms 42 stride portions 46 of the members 45. A removable plate 47 having a curved face 48 which cooperates with the eccentric 43 to clamp the plates rests on the portion 45.

The plate 29 of the mold rests on a series of trucks 49 which travel on the tracks 50. The tracks 50 in their turn are adapted to travel on stationary tracks 51. This arrangement permits the mold to be transferred from a position in front of one chamber to a position in front of another of the battery of vulcanizing chambers.

The following is a description of the vulcanizing process as carried out in practice by means of the apparatus shown herein.

The wire or cable of the type shown in Fig. 6 or 7 and which has been put through the steps of the process so far described is cut into predetermined lengths. I use either fifty or hundred foot lengths. With the upper plate 30 raised a length of wire is placed in each of the grooves 31. One end of the wire is attached to the corresponding post 36 in the manner shown. A workman skilled in the process pulls the free end of the wire taut and attaches the free end to the corresponding post 36 at the other end of the plate. All or any number of the grooves 31, of which there may be any desired number, are filled with unvulcanized rubber covered wires in this manner. The upper plate 30 is then lowered into position, the U-shaped members 39 serving to guide it into proper alinement. The plates are then clamped by the means previously described. The overall diameter of the insulated wire is such as to completely fill the grooves. The wire may be slightly oversize. The mold and trucks 40 are now placed in the vulcanizing chamber 20. The angle irons 26, 27 serve as guides and tracks for the wheels of the trucks.

The chamber is now closed air tight. Steam or any other heating fluid is allowed to flow into the chamber for a predetermined length of time. During this treatment the rubber becomes semifluid and expands. The pressure is such as to cause the excessive rubber to flow in a thin sheet between the plates and partly fill the grooves 34, 35. At the end of the vulcanization period the steam is shut off, the mold is removed from the chamber, the plate 30 is raised, and the wires are removed from the mold. The apparatus is now free to receive another charge. When the outer layer of rubber is made oversize prior to the final step of vulcanization, the rubber is subjected to pressure during the step of clamping the plates. This pressure aids and augments the pressure developed during vulcanization.

The temperature and the pressure of the steam that I find give the best results are in the vicinity of 280 degrees F. and 35 pounds gauge respectively. The time of the final step of vulcanization may be varied with other factors. In my practice I find that one hour gives the best results. This constitutes a great saving of time as compared with the processes used hitherto.

Fig. 6 shows a modification in which there are three layers of rubber, 60, 61, and 62 separated by two interlayers 63 and 64 of fibrous material.

While my process as described above is applicable to all kinds of wires covered with any rubber compound, it is of particular advantage in use with wires which have what are termed "soft" rubber compounds for their insulation. The following are examples of "soft" rubber compounds that I have used successfully in my process.

| | Pounds. | | Pounds. |
|---|---|---|---|
| Crude rubber | 30 | Crude rubber | 50 |
| Barytes | 30 | Hydrocarbon | 40 |
| Whiting | 30 | Sulphur | 3 |
| Sulphur | 1½ | Magnesia | 1 |
| Litharge | 3 | Litharge | 4 |
| Petrolatum | 3½ | Lime | 1 |
| Paraffine | 2 | Paraffine | ½ |
| | | Petrolatum | ½ |

The wire manufactured in accordance with this invention have a uniform cross sectional dimension, and a relatively hard smooth surface. The toughness and tensile strength of the rubber as well as all other mechanical properties desirable in high tension ignition wires are increased. The voltage carrying capacity of the wire having one interlayer of fibrous material as compared with a wire of the same dimensions and having only rubber for its insulation is increased by 25% to 30%. Two interlayers of fibrous material as shown in Fig. 6 increase the voltage carrying capacity of the wire about 50%.

The only theory available which explains the increase in the dielectric strength of the resulting insulating covering, is based on the fact that the interlayer of fibrous material has a substantially greater conductivity than that of the rubber compound. The interlayer serves to distribute the electrostatic stresses that may arise along any line radiating from the conductor over the entire inner surface of the outer layer of rubber or over a sufficient portion of it to reduce the likelihood of the insulation breaking down along that line.

I claim:

1. The method of manufacturing insulated electric wires or cables which comprises the steps of applying a layer of rubber compound to the conductor, applying a layer of fibrous material, semivulcanizing said layer, applying a second layer of rubber compound, and vulcanizing the rubber under pressure between heated plates.

2. The method of manufacturing insulated electric wires or cables which comprises the steps of applying a layer of rubber compound to the conductor, applying a continuous sheath of fibrous material over said layer, semivulcanizing said layer, applying a second layer of rubber compound, placing the wire or cable between grooved plates, clamping the plates to withstand high internal pressures, and subjecting the plates to vulcanizing heat whereby the rubber is subjected to high pressures.

3. The method of manufacturing insulated electric wires or cables which comprises the steps of applying a layer of rubber compound to the conductor, applying a layer of fibrous material, semivulcanizing said layer of rubber, applying a second layer of rubber compound and vulcanizing the rubber at a pressure exceeding three hundred pounds per square inch.

In testimony whereof I have hereunto set my hand.

HARRY B. BURLEY.